(12) United States Patent
Delgado et al.

(10) Patent No.: US 11,421,615 B2
(45) Date of Patent: Aug. 23, 2022

(54) MOLDED AIR INTAKE SYSTEM AND METHOD FOR INTERNAL COMBUSTION ENGINES

(71) Applicant: Injen Technology Company, Ltd., Pomona, CA (US)

(72) Inventors: Ron Delgado, Pomona, CA (US); Jay Crouch, Pomona, CA (US)

(73) Assignee: INJEN TECHNOLOGY COMPANY LTD., Pomona, CA (US)

( * ) Notice: Subject to any disclaimer, the term of this patent is extended or adjusted under 35 U.S.C. 154(b) by 332 days.

(21) Appl. No.: 16/406,309

(22) Filed: May 8, 2019

(65) Prior Publication Data

US 2020/0355137 A1    Nov. 12, 2020

(51) Int. Cl.
| | |
|---|---|
| *F02D 41/18* | (2006.01) |
| *F02M 35/10* | (2006.01) |
| *F02M 35/04* | (2006.01) |
| *F02M 35/024* | (2006.01) |
| *B29C 45/26* | (2006.01) |
| *B29L 23/00* | (2006.01) |

(52) U.S. Cl.
CPC .......... *F02D 41/18* (2013.01); *B29C 45/2614* (2013.01); *F02M 35/024* (2013.01); *F02M 35/04* (2013.01); *F02M 35/10144* (2013.01); *F02M 35/10386* (2013.01); *B29L 2023/22* (2013.01)

(58) Field of Classification Search
CPC ...... F02D 41/18; F02M 35/024; F02M 35/04; F02M 35/10118; F02M 35/10373; F02M 35/10249; F02M 35/10144; F02M 35/10386
See application file for complete search history.

(56) References Cited

U.S. PATENT DOCUMENTS

| | | | | |
|---|---|---|---|---|
| 6,267,006 | B1 * | 7/2001 | Bugli | F02M 35/021 |
| | | | | 73/114.34 |
| 7,359,795 | B2 * | 4/2008 | Delgado | F02M 35/04 |
| | | | | 123/479 |
| 7,669,571 | B2 * | 3/2010 | Delgado | F02M 35/1255 |
| | | | | 123/184.21 |
| 7,721,699 | B2 * | 5/2010 | Delgado | F02M 35/10386 |
| | | | | 123/184.53 |
| 8,807,118 | B2 * | 8/2014 | Lukasavitz | F02M 35/10262 |
| | | | | 123/402 |
| 9,440,175 | B2 * | 9/2016 | Niakan | B01D 46/2411 |
| 2004/0055570 | A1 * | 3/2004 | Bielicki | F15D 1/04 |
| | | | | 123/402 |
| 2009/0241683 | A1 * | 10/2009 | Perr | G01F 15/185 |
| | | | | 73/861 |

* cited by examiner

*Primary Examiner* — Grant Moubry

(74) *Attorney, Agent, or Firm* — Myers Andras Ashman Bisol LLP; Joseph C. Andras

(57) ABSTRACT

A Molded Air Intake System and Method for Internal Combustion Engines. The method of the present invention permits the single-shot molding of an air intake system, such as by roto-molding. The resultant air intake system has an internal pipe element and an external element, both of which are formed with superior molding tolerances. The internal pipe element is defined by an inner mold form that is insertable and removable from an external mold form. The final molded part defines an outer wall and an inner wall and an MAFS mounting pad having inner and outer apertures formed therethrough.

8 Claims, 9 Drawing Sheets

MOLDED AIR INTAKE SYSTEM AND METHOD FOR INTERNAL COMBUSTION ENGINES

BACKGROUND OF THE INVENTION

1. Field of the Invention

This invention relates generally to internal combustion engines and accessories therefor and, more specifically, to a Molded Air Intake System and Method for Internal Combustion Engines.

2. Description of Related Art

One of the most popular horsepower-improving aftermarket products for vehicles is the "cold air intake" system. As the name suggests, one thing that these systems do is to locate (or relocate) the front end of the air intake tract to a location that is outside of the engine compartment (many times behind the vehicle's bumper).

The most common and most effective cold air intake design use sections of mandrel bent pipe, connected with turbo hose connectors, leading from the throttle body, and out of the engine compartment to the area behind the bumper or behind the fender, where a cone filter is fitted to the pipe to draw in cool air from outside the engine compartment. The combination of the cooler intake air and the reduction in flow resistance results in significant power increase. In addition, the modified intake tract will typically be three or more feet in length, causing it to effectively act as an extension of the intake manifold of the engine, almost as if it were a header for the intake side of the engine, improving low and mid-range torque.

Furthermore, the added length of the pipe also encourages something called "laminar air flow effect" whereby the air passing through the pipe is unobstructed and begins to act somewhat more like a liquid than a gas, gaining momentum as it passes down the pipe and resisting anything that would stop its flow. This is known as an "air ramming effect."

While the power improvements made available by cold air intake systems are well-known, so are the problems associated with them. First, the OEM intake tract has a "Mass Airflow Sensor" (MAFS) attached to it. The MAFS is a very important sensor that detects the airflow in the intake tract and reports this information to the engine's central computer. The central computer uses this information to adjust the combustion performance factors of the engine so that the engine runs cleanly and smoothly.

In the past, it was common to receive "check engine" lights when installing aftermarket cold air intake systems in vehicles because the flowrate of the incoming air has increased so much (because the theory has always been "more is better") that the values are outside those expected by the central computer. In fact, some vehicle models and/or intake systems were suspected to actually cause damage to the engine.

These "check engine" lights problems were first addressed and remedied by U.S. Pat. No. 7,669,571 "Calibrated air intake system for internal combustion engines," via the "Calibration method for air intake tracts for internal combustion engines" that is the subject of U.S. Pat. No. 7,359,795. The inventions of the '571 and the '795 patents involved the replacement of a segment of the cold air intake system with an "MAFS tract" which has an inner diameter that is smaller as compared to the rest of the air intake tract. The purpose of the reduced (calibrated) diameter in the vicinity of the Mass Airflow Sensor is to eliminate check engine alarms by providing mass airflow conditions within the vicinity of the Mass Airflow sensor that are within the normal range. The '571 and '795 patents were improved upon in U.S. Pat. No. 7,721,699 for "Calibrated air intake tract having air infusion insert" by the same inventor.

While the '571, '795 and '699 innovations are still robust and valued, they are generally restricted to being constructed from stainless steel piping. Due to cost and weight considerations, much of the intake systems for internal combustion engines is comprised of molded plastic components. In particular, a technique known as "roto molding" is used to form the bulk of the components of the air intake tract.

The problem with creating a roto-molded plastic MAFS system is that the conventional roto molding process is limited to applying a coating of plastic to the interior surface of a mold to a desired thickness. The conventional roto molding process does not provide the control, repeatability or tolerances necessary to create a molded product that has a portion of the internal diameter of the piping that is less than the rest of the molded part's internal diameter. Conventionally, it is impossible to control the wall thickness during the molding process simply by having an external mold. What is needed is a method and resultant molded plastic MAFS tract having an external molded surface as well as a portion of the tract having an internal molded surface.

SUMMARY OF THE INVENTION

In light of the aforementioned problems associated with the prior devices and methods, it is an object of the present invention to provide a Molded Air Intake System and Method for Internal Combustion Engines. The method of the present invention should permit the single-shot molding of an air intake system, such as by roto-molding. The resultant air intake system should have an internal pipe element and an external element, both of which are formed with superior molding tolerances. The internal pipe element should be defined by an inner mold form that is insertable and removable from an external mold form. The final molded part should define an outer wall and an inner wall and an MAFS mounting pad having inner and outer apertures formed therethrough.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Molded Air Intake System and Method for Internal Combustion Engines.

Figure 1:
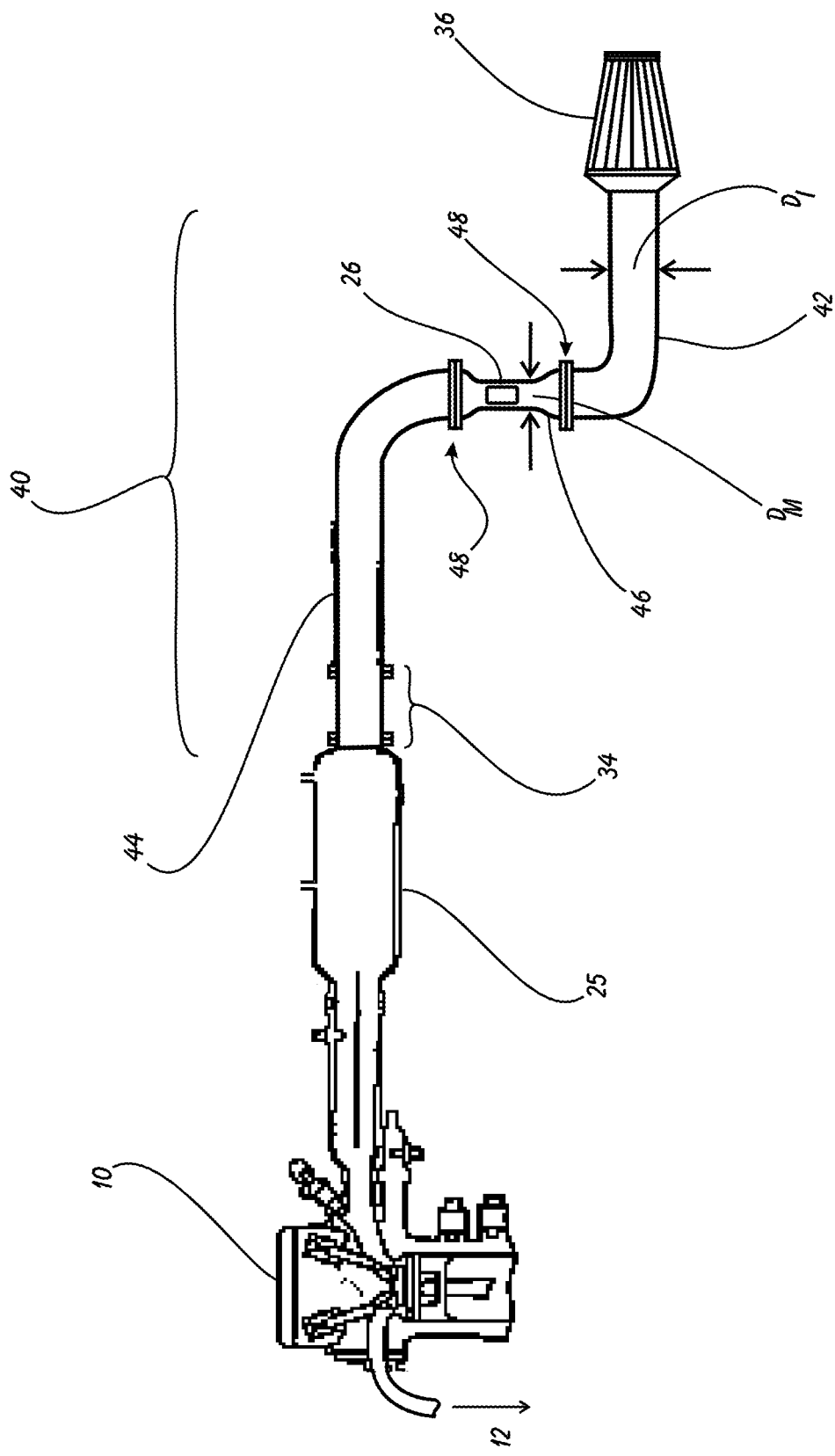
FIG. 1 is a schematic view of an intake system for internal combustion engines incorporating the intake section of the present invention.

The present invention can best be understood by initial consideration of FIG. 1. FIG. 1 depicts a convention internal combustion engine 10 having a (cold air) intake system 40 of the present invention incorporated within it. Following the air flow path, the system begins with the intake air filter 36, which is attached to distal pipe portion 42. The distal pipe portion, having internal diameter $D_1$, transitions into MAFS intake section 46, here a straight section with suitable mounting flanges 48, having a reduced diameter $D_M$. MAFS intake section 46 has a MAFS conduit 26 formed through its wall. As used throughout this disclosure, element numbers enclosed in square brackets [ ] indicates that the referenced element is not shown in the instant drawing figure, but rather is displayed elsewhere in another drawing figure.

The MAFS intake section 46 transitions into proximal intake pipe portion 44, which connects to throttle body 25, which feeds fuel and air to the engine 10. As discussed above, many of these components are now made from either rigid plastic (or flexible hoses), rather than from expensive steel.

Figure 2:
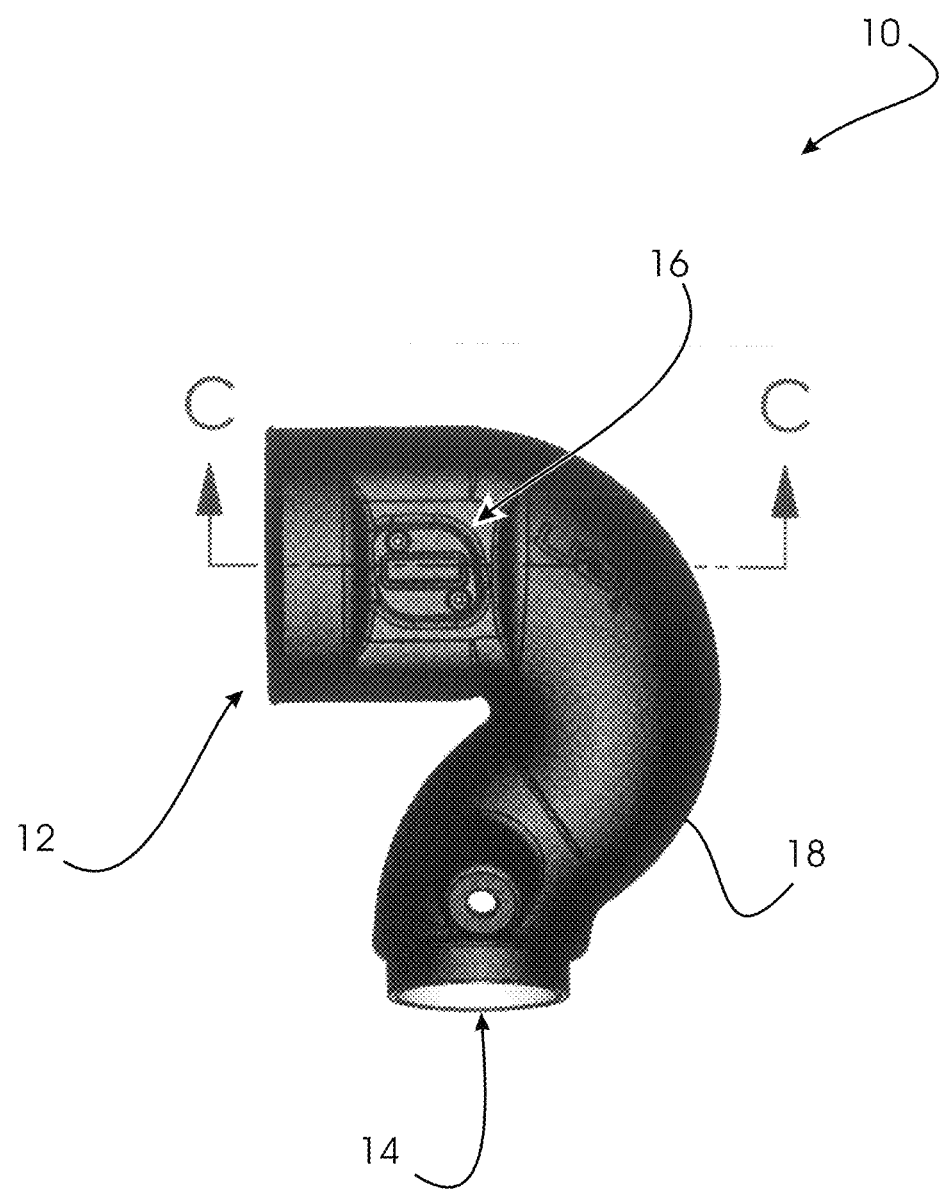
FIG. 2 is a side view of a preferred embodiment of the molded MAFS intake section.

FIG. 2 is a side view of a preferred embodiment of a molded MAFS intake section 10 that has a curved configuration rather than a straight configuration. As discussed above relative to the MAFS intake section 46 that is straight, the MAFS intake section 10 that is curved will be installed as a replacement for a similar section of the piping in the original equipment (OEM) air intake system. This is usually a part of an entire replacement air intake system kit (i.e. a cold air intake kit).

The molded section 10 has the same basic components as described in the '571 patent. An inlet end 12 and an outlet end 14 interconnected by a section of piping that is shaped specific for the particular internal combustion engine for which the section 10 is designed to fit into. There is a recessed MAFS mounting pad 16 formed in the wall 18 of the section 10. The MAFS mounting pad 16 is the location where the installer will attach the OEM mass airflow sensor. If we now turn to FIG. 3, we can delve deeper into the structural features of the section 10.

Figure 3:
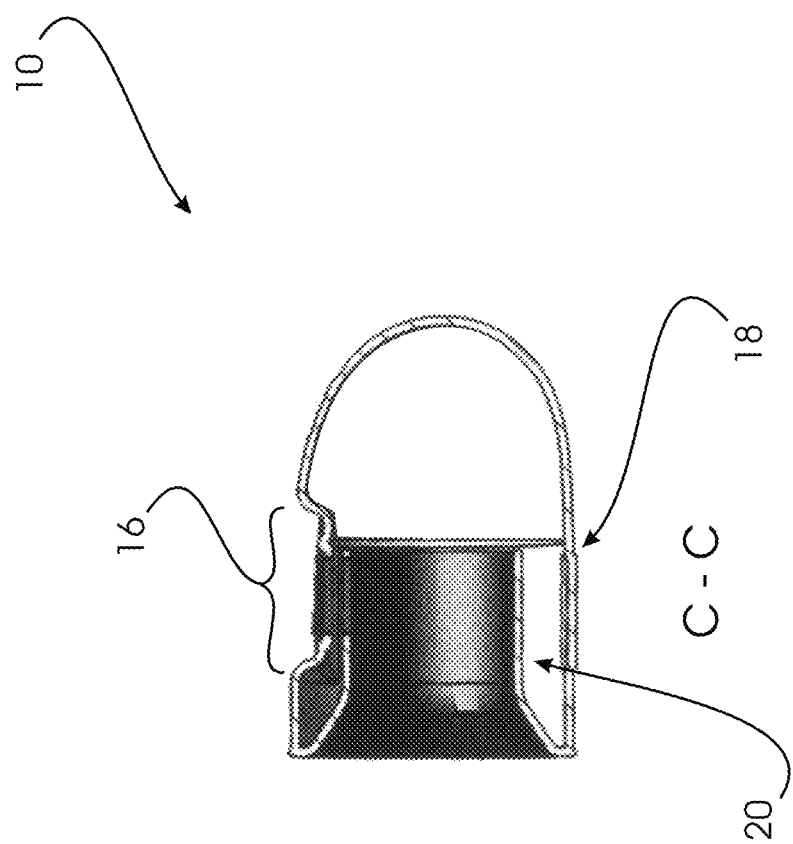
FIG. 3 is a cutaway top view of the intake section of FIG. 2.

FIG. 3 is a cutaway top view of the MAFS intake section 10 of FIG. 2, along section C-C. As can be seen here, the section is defined by an outer wall 18, and a partial inner wall 20. The MAFS mounting pad 16 is a recessed portion formed in the outer wall 18 in a location that is along the partial inner wall 20.

Figure 4:
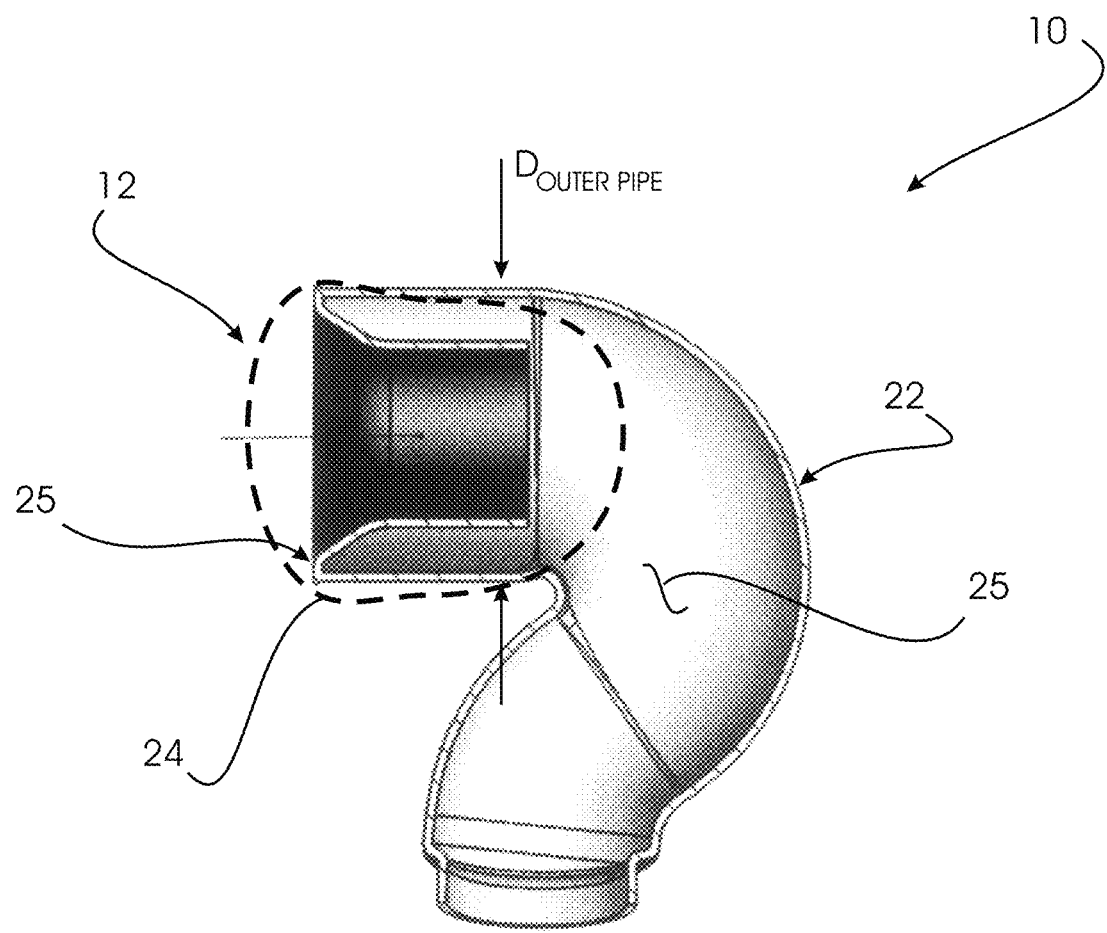
FIG. 4 is a cutaway side view of the intake section of FIGS. 2 and 3.
Figure 5:
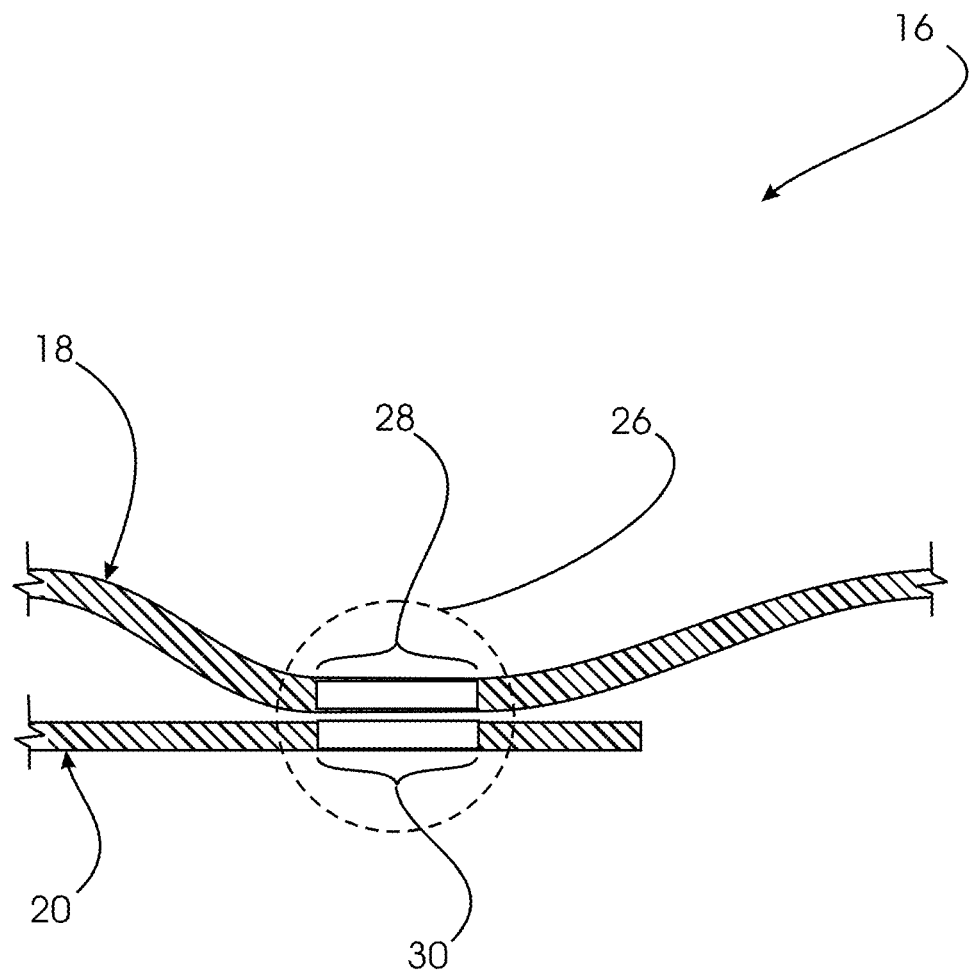
FIG. 5 is a partial cutaway view of FIG. 3.

FIG. 4 is a cutaway side view of the intake section 10 of FIGS. 2 and 3. The outer wall [18] defines an external pipe element 22. The inner partial wall [20] defines an internal pipe element 24. The internal pipe element 24 and the external pipe element 22 are formed from a single piece of material that is molded in a single-shot molding process. The section 10 transitions from the external pipe element 22 and into the internal pipe element 24 at the inlet end 12. This structure creates a smooth lip 25 at the inlet end 12 so that unwanted flow turbulence is not created. Furthermore, the lip 25 is double-walled, and therefore is substantially stronger than is the rest of the external pipe element 22. FIG. 5 depicts particularly important features of this design.

FIG. 5 is a partial cutaway view of the pipe element 22 depicted in FIG. 3. The MAFS mounting pad 16, as discussed above, is the location at which the OEM Mass Airflow Sensor is attached. Because the MAFS samples the airflow within the flow conduit [25], the MAFS has a probe that must be inserted into the flow conduit [25]. Consequently, there is an MAFS conduit 26 formed in the MAFS mounting pad 16. The MAFS conduit 26 consists of an inner aperture 30 formed in the inner wall 20, and an outer aperture 28 juxtaposed over the inner aperture 30 formed in the outer wall 18. The MAFS air sampling probe (not shown) is inserted through the MAFS conduit 26 when the MAFS is installed in the MAFS mounting pad 16. If we now look at FIG. 6, we can examine this innovation more closely.

Figure 6:
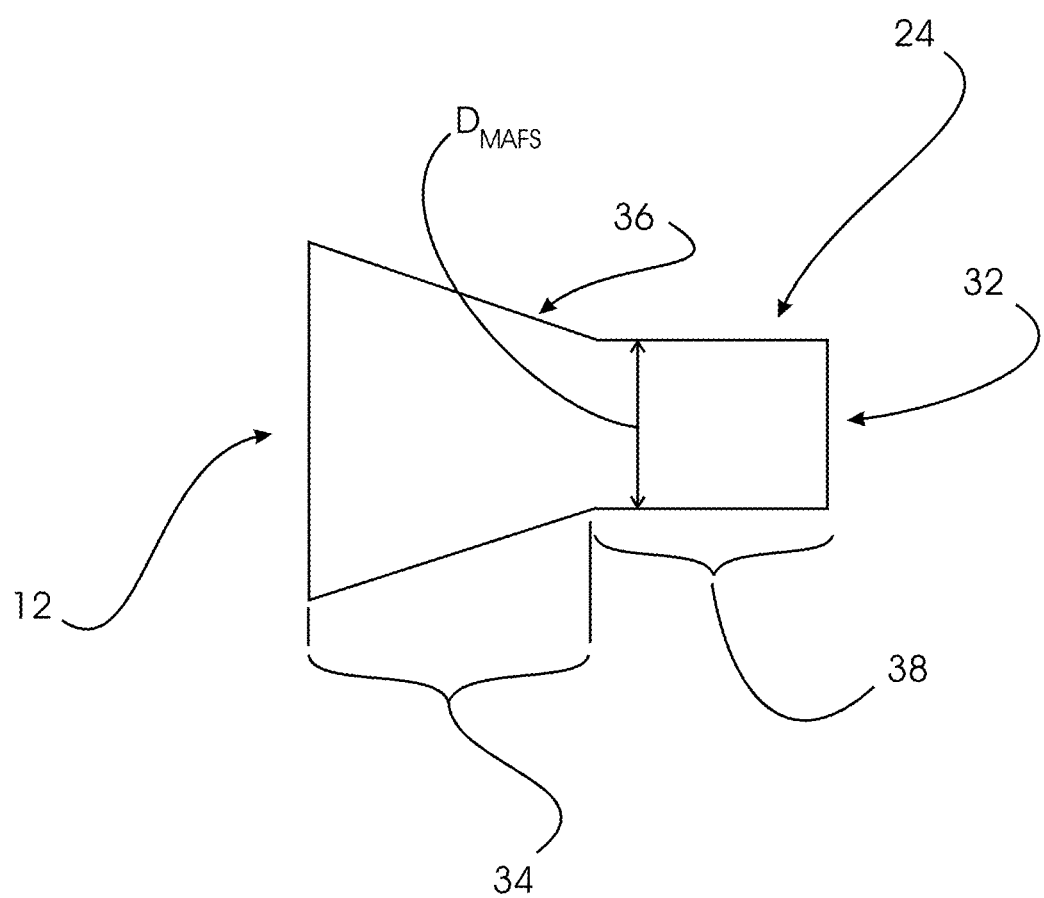
FIG. 6 is a partial cutaway view of FIG. 4.

FIG. 6 is a partial cutaway view of the pipe element 22 depiction of FIG. 4. The internal pipe element 24 is a "trumpet-shaped" piping section that is internal to the pipe element 22. The internal pipe element 24 has a wide opening at the inlet end 12 of the pipe element 22. This is the opening to a conically-shaped section 34. At the narrow (exit) end of the conical section 34, there is a smooth transition section 36 in the wall of the internal pipe element 24 that connects to the internal MAFS pipe section 38. The internal MAFS section is defined by D(MAFS), or the "MAFS Diameter," which is a diameter that has been determined by provide the desired mass airflow reading at the MAFS. As discussed above, D(MAFS) is smaller than D(OUTER PIPE) depicted in FIG. 5. In the '571 patent, employing metal piping, this reduced diameter in the vicinity of the MAFS probe was accomplished by "necking down" the metal piping section. This is not feasible for a molded plastic process because the interior diameter of the piping is dependent upon material thickness and other factors that make it impossible to repeatably obtain the interior diameter within the necessary dimensional tolerance. If the interior diameter is not the desired D(MAFS), "check engine" errors will most likely result. This uncertainty is what led to the innovation described herein. Now turning to FIG. 7, we can begin to examine how this innovative product is manufactured.

Figure 7:
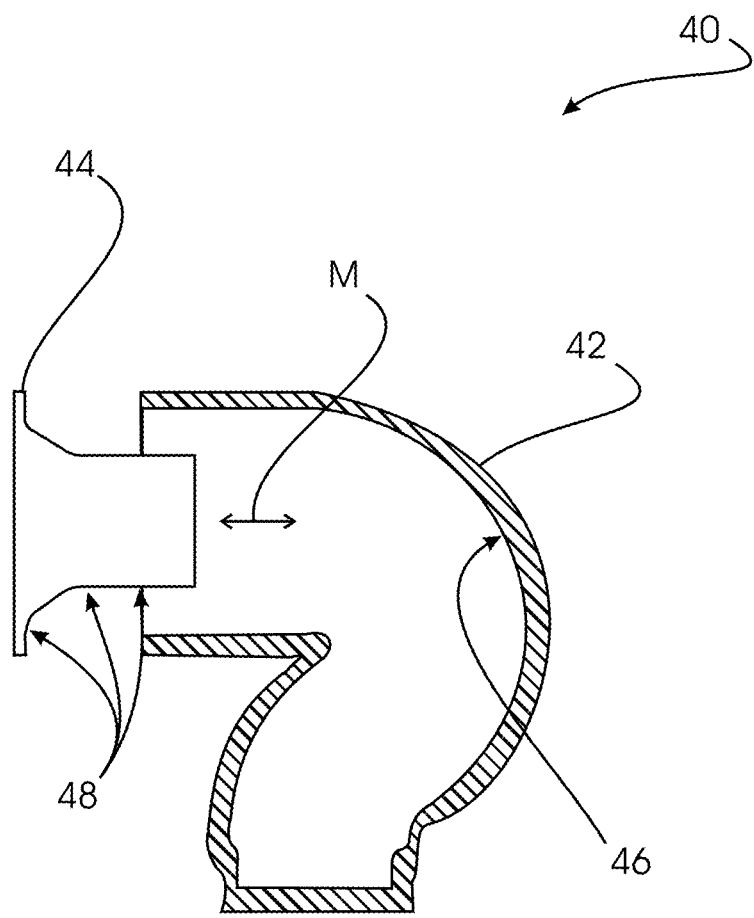
FIG. 7 is an exploded cutaway side view of a preferred embodiment of a mold for the MAFS intake section of FIGS. 1-6.
Figure 8:
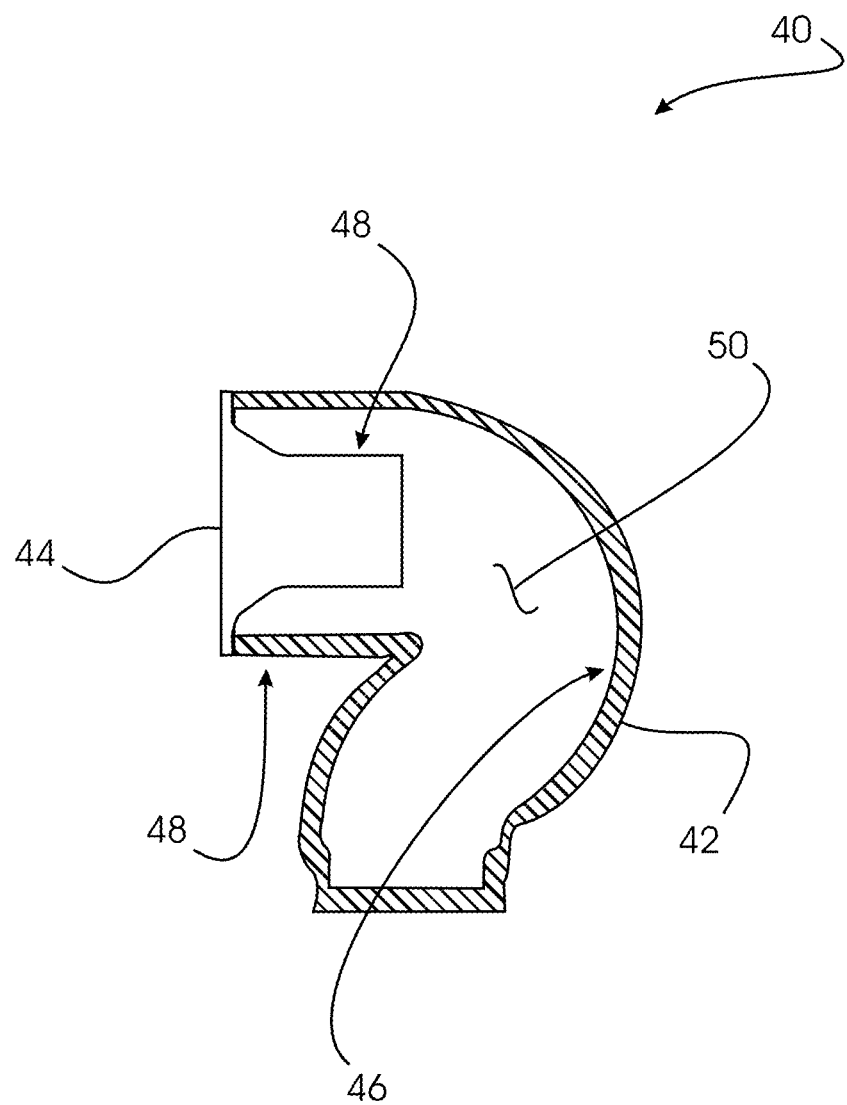
FIG. 8 is a cutaway side view of the mold of FIG. 7 with the inner mold form inserted.
Figure 9:
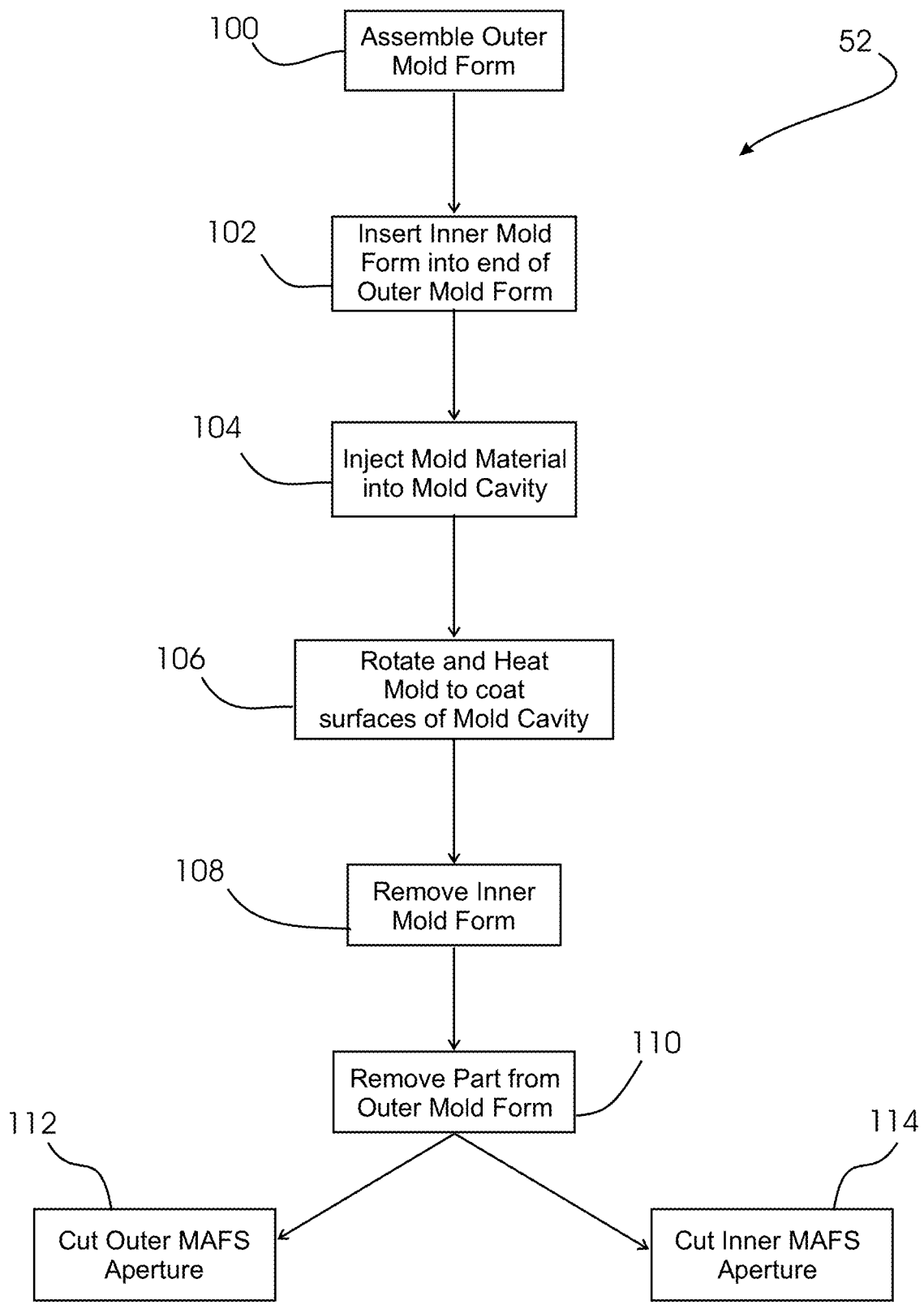
FIG. 9 is a flowchart of a preferred method for producing the intake section of FIGS. 1-6.

FIG. 7 is an exploded cutaway side view of a preferred embodiment of a mold 40 for the MAFS intake section of FIGS. 1-6. The critical distinction between this mold 40 and conventional molds for roto-molded products is that there is both an outer mold form 42 and also an inner mold form 44. The outer mold form 42 defines the outer finished surface of the external pipe element [22] because the plastic molding material is formed by the external pipe element mold surface 46 (which is the inner surface of the outer mold form 42). The inner mold form 44 defines the inner finished surface of the internal pipe element [24] because the plastic molding material is formed by the internal pipe element mold surface 48. The inner mold form 44 is movable in direction "M"—in FIG. 7, it is shown partially removed from the outer mold form. In FIG. 8, the inner mold form 44 is shown in its position when the molding of the plastic piece is in progress. As shown in FIG. 8, the inner mold form 44 has been inserted into the outer mold form 42 to seal the inlet end of the mold cavity 50. The outlet end of the mold cavity 50 is sealed by a wall of the outer mold form. It should be understood that the outer mold form 42 is most likely comprised of two pieces—each piece forming one side of the molded part. As such, in order to remove a finished part from the mold 40, the inner mold form 44 is removed (direction "M" of FIG. 7) and the two mold-halves comprising the outer mold form 42 are then separated. FIG. 9 depicts this process in detail.

FIG. 9 is a flowchart of a preferred method 52 for producing the intake section of FIGS. 1-5. First, the outer mold form is assembled 100 (i.e. all of the parts of the outer mold are assembled). The inner mold form is then inserted into the open end of the outer mold form 102. Plastic mold material is then injected into the mold cavity 104, and the mold is then heated and rotated in order that the surfaces of the mold cavity [50] are coated with the desired thickness of plastic 106. The mold is heated and then cooled so that the injected molded material is formed into a homogeneous piece of rigid plastic, and then the inner mold form is removed from the outer mold form 108. After the molded part is removed from the outer mold form 110, the outer and inner MAFS apertures are cut through the outer and inner walls [18, 20], respectively in order to form the MAFS conduit [26].

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An air intake system for aftermarket installation on an internal combustion engine of an OEM automobile, the system comprising a replacement mass airflow (MAF) sensor section configured as a replacement for a similar section in an OEM air intake tract that has an original MAF sensor, the replacement MAF sensor section comprising:
   a MAF sensor pipe portion comprising:
      an external pipe element defining a first inner diameter; and
      an internal pipe element defining a second inner diameter, said second inner diameter being smaller than said first inner diameter, and said internal pipe element being located within a flow chamber defined by said external pipe element;
   a MAF sensor mounting pad located on said extremal element; and
   a MAF sensor conduit formed through said MAF sensor mounting pad and into said flow chamber, wherein said MAF sensor conduit comprises an outer aperture formed in said external pipe element and an inner aperture formed in said internal pipe element, and wherein said outer aperture is juxtaposed over said inner aperture.

2. The air intake system of claim 1, wherein said MAF sensor pipe portion is defined by an inlet end and an outlet end and said internal pipe element extends internally from said external pipe element from a lip at said inlet end.

3. The air intake system of claim 1, wherein:
   said internal pipe element comprises a conical section extending from said lip, a transitional section extending from said conical section, and an internal pipe section extending from said transitional section and terminating in an internal outlet end; and
   said inner aperture is formed through said pipe section.

4. The aft intake system of claim 3, wherein an interior of said internal pipe section defines said second inner diameter and said conical section defines a diameter greater than said second inner diameter at said lip.

5. The air intake system of claim 4, wherein said internal pipe element and said external pipe element are formed from a single piece of non-metallic material.

6. An air intake system for aftermarket installation on an internal combustion engine of an OEM automobile, the system comprising a replacement mass airflow (MAF) sensor section configured as a replacement for a similar section in an OEM air intake tract that has an original MAF sensor, the replacement MAF sensor section comprising:
   a MAF sensor pipe portion comprising:
   an external pipe element defining a first inner diameter; and
   an internal pipe element defining a second inner diameter, said second inner diameter being smaller than said first inner diameter, and said internal pipe element being located within a flow chamber defined by said external pipe element;
   a MAF sensor mounting pad located on said external pipe element;
   a MAF sensor conduit formed through said MAF sensor mounting pad and into said flow chamber, wherein said MAF sensor conduit comprises an outer aperture formed in said external pipe element and an inner aperture formed in said internal pipe element, and wherein said outer aperture is juxtaposed over said inner aperture; and
   wherein said internal pipe element and said external pipe element are formed from a single piece of non-metallic material.

7. The air intake system of claim 6, wherein said pipe portion is defined by an inlet end and outlet end and said internal pipe element extends internally from said external pipe element from a lip at said inlet end.

8. The air intake system of claim 6, wherein said interior of an internal pipe section defines said second inner diameter and said conical section defines a diameter greater than said second inner diameter at said lip.

* * * * *